United States Patent
Kawakami (10) Patent No.: US 10,391,820 B2
(45) Date of Patent: Aug. 27, 2019

(54) PNEUMATIC TIRE

(71) Applicant: BRIDGESTONE CORPORATION, Chuo-ku, Tokyo (JP)

(72) Inventor: Yuki Kawakami, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 64 days.

(21) Appl. No.: 14/773,850

(22) PCT Filed: Mar. 13, 2014

(86) PCT No.: PCT/JP2014/057635
§ 371 (c)(1),
(2) Date: Sep. 9, 2015

(87) PCT Pub. No.: WO2014/142349
PCT Pub. Date: Sep. 18, 2014

(65) Prior Publication Data
US 2016/0023518 A1    Jan. 28, 2016

(30) Foreign Application Priority Data
Mar. 13, 2013  (JP) .................................. 2013-050304

(51) Int. Cl.
*B60C 11/13*  (2006.01)
*B60C 11/03*  (2006.01)
*B60C 11/12*  (2006.01)

(52) U.S. Cl.
CPC ........ *B60C 11/1307* (2013.01); *B60C 11/032* (2013.01); *B60C 11/0311* (2013.01);
(Continued)

(58) Field of Classification Search
CPC ............. B60C 11/1218; B60C 11/1281; B60C 11/1204; B60C 11/1376; B60C 11/1392;
(Continued)

(56) References Cited

U.S. PATENT DOCUMENTS

| | | | | |
|---|---|---|---|---|
| 5,593,521 A | * | 1/1997 | Iseki | ......................... B60C 9/20 |
| | | | | 152/209.28 |
| 2005/0072505 A1 | * | 4/2005 | Takahashi | ............... B60C 11/11 |
| | | | | 152/209.15 |

(Continued)

FOREIGN PATENT DOCUMENTS

EP    2311656 A1    4/2011
EP    2311656 B1    3/2013
(Continued)

OTHER PUBLICATIONS

English machine translation of EP231656, no date.*
(Continued)

*Primary Examiner* — Robert C Dye
(74) *Attorney, Agent, or Firm* — Kenja IP Law PC (57) ABSTRACT

Provided is a pneumatic tire being improved in heat dissipation effect in the tread portion while being ensured in rigidity of the land portion. A narrow groove (9) is formed on a tread surface (1), the narrow groove extending in a direction inclined relative to the tire circumferential direction and having a groove width (W1) and a groove depth (D1), the groove width (W1) being smaller than the groove depth (D1). The narrow groove (9) opens at both ends thereof to the outside of the land portion. An air inflow part (10) is formed on at least one of the groove walls (9c) of the narrow groove (9), the groove walls facing each other in the tire circumferential direction, where the narrow groove (9) has a maximum depth (D1) and the air inflow part (10) has a maximum depth (D2), the D1 and the D2 satisfying 5<D1/D2≤15.

9 Claims, 7 Drawing Sheets
(1 of 7 Drawing Sheet(s) Filed in Color)

(52) U.S. Cl.
CPC ...... *B60C 11/0316* (2013.01); *B60C 11/1392* (2013.01); *B60C 11/1281* (2013.01); *B60C 2011/0339* (2013.01); *B60C 2011/0381* (2013.01); *B60C 2011/1209* (2013.01); *B60C 2011/133* (2013.01); *B60C 2200/065* (2013.01)

(58) Field of Classification Search
CPC ......... B60C 11/1263; B60C 2011/0367; B60C 11/1307; B60C 11/1323; B60C 2011/133; B60C 11/1384; Y10T 152/10801
See application file for complete search history.

(56) References Cited

U.S. PATENT DOCUMENTS

| | | | |
|---|---|---|---|
| 2010/0084062 A1 | 4/2010 | Miyazaki et al. | |
| 2010/0101695 A1* | 4/2010 | Ueda | B60C 11/0302 152/209.15 |
| 2011/0005652 A1* | 1/2011 | Ono | B60C 11/0309 152/209.18 |

FOREIGN PATENT DOCUMENTS

| | | |
|---|---|---|
| JP | H07-101210 A | 4/1995 |
| JP | 2003-205706 A | 7/2003 |
| JP | 2007-191093 A | 8/2007 |
| JP | 2007-230399 A | 9/2007 |
| JP | 2012-001154 A | 1/2012 |
| JP | 2012-035664 A | 2/2012 |
| WO | 2013/035889 A1 | 3/2013 |

OTHER PUBLICATIONS

Jun. 10, 2014 International Search Report issued in International Patent Application No. PCT/JP2014/057635.

Feb. 25, 2014, Notification of Reasons for Refusal issued by the Japan Patent Office in the corresponding Japanese Patent Application No. 2013-050304.

Jun. 3, 2014, Official Decision of Refusal issued by the Japan Patent Office in the corresponding Japanese Patent Application No. 2013-050304.

Jun. 16, 2015, Notification of Reasons for Refusal issued by the Japan Patent Office in the corresponding Japanese Patent Application No. 2013-050304.

* cited by examiner

FLOW RATE [Km/h]

PNEUMATIC TIRE

TECHNICAL FIELD

This disclosure relates to a pneumatic tire enhanced in heat dissipation effect in a tread portion.

BACKGROUND

The tread portion generates heat during rotation of the tire with a load applied thereon and is subjected to high temperature, which leads to various failures such as heat separation. Therefore, in order to lower the temperature of the tread portion, it is necessary to reduce the heat generation or to promote heat dissipation.

Conventionally, in order to lower the temperature of the tread portion, there has been employed a method of forming grooves in the tread portion so as to remove tread rubber that serves as a heat source while increasing a surface area of the tread portion such that the heat dissipation is enhanced (see, for example, Patent Literature 1).

Further, in order to enhance heat dissipation effect in the tread portion, there has also been known a technology in which, with respect to a narrow groove extending in the width direction, small grooves extending in a direction intersecting the longitudinal direction of the narrow groove are provided, so as to disturb the flow of air within the narrow grooves (see, for example, Patent Literature 2).

CITATION LIST

Patent Literature

PTL 1: JP 2003-205706 A
PTL 2: JP 2007-230399 A

SUMMARY

Technical Problem

However, in a groove that is narrow in width and extends in the tire width direction is unlikely to generate airflow within the groove. Further, it is necessary to further increase the number of grooves in order to improve the effect of lowering the temperature. Such an increase in the number of grooves, however, leads to a reduction in rigidity of a land portion, causing deterioration of antiwear performance and steering stability.

Therefore, it could be helpful to provide a pneumatic tire improved in heat dissipation effect of the tread portion while ensuring rigidity of the land portion.

Solution to Problem

It could therefore be helpful to provide a pneumatic tire including a narrow groove formed on a tread surface, the narrow groove being inclined with respect to the tire circumferential direction and having a groove width smaller than the groove depth, the narrow groove opening at both ends thereof to the outside of the land portion, an air inflow part opening to the tread surface being formed at least one of the groove walls of the narrow groove, the groove walls facing each other in the tire circumferential direction, the pneumatic tire having a feature in that the narrow groove has a maximum width D1 and the air inflow part has a maximum depth D2, the D1 and the D2 satisfying: $5 < D1/D2 \leq 15$. Here, "the narrow groove opens at both ends thereof to the outside of the land portion" means that the narrow groove communicates with another groove or a tread surface end without terminating at both ends within the land portion.

Advantageous Effect

It is possible to provide a pneumatic tire improved in heat dissipation effect in the tread portion while ensuring rigidity of the land portion.

BRIEF DESCRIPTION OF THE DRAWINGS

The patent or application file contains at least one drawing executed in color. Copies of this patent or patent application publication with color drawing(s) will be provided by the Office upon request and payment of the necessary fee. In the accompanying drawings.

DETAILED DESCRIPTION

In the following, an embodiment of the disclosed pneumatic tire is illustrated by way of an example, with reference to the accompanying drawings.

Figure 1A:
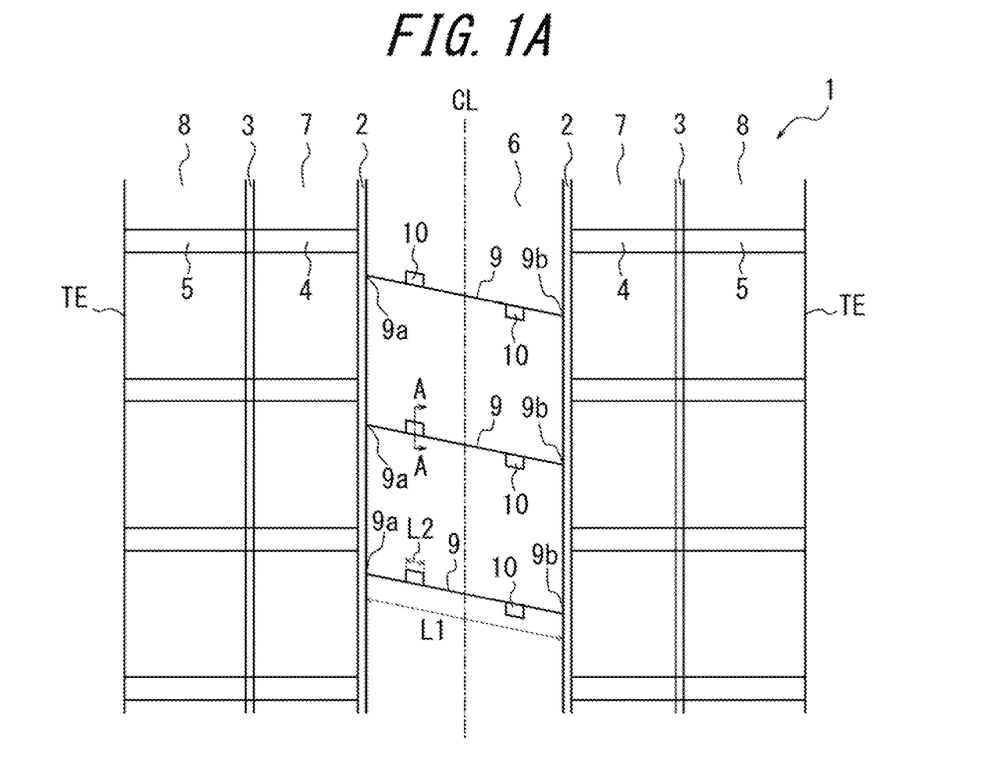
FIG. 1(a) is a developed view of a tread pattern of the disclosed pneumatic tire according to an embodiment thereof.

FIG. 1(a) is a developed view of a tread pattern of the disclosed pneumatic tire according to an embodiment thereof. A tread surface 1 of the pneumatic tire includes: a pair of central circumferential grooves 2 extending along the tire circumferential direction across a tire equatorial plane CL; a pair of lateral circumferential grooves 3 extending along the tire circumferential direction, on the tire width direction outside of the central circumferential grooves 2; an intermediate widthwise groove 4 extending along the tire width direction while communicating with the central circumferential grooves 2 and with the lateral circumferential grooves 3; and a lateral widthwise groove 5 extending along the tire width direction while communicating with the lateral circumferential grooves 3 and extending toward a tread surface end TE.

The central circumferential grooves 2 define a central land portion 6 that includes the tire equatorial plane CL. The central circumferential grooves 2, the lateral circumferential grooves 3, and the intermediate widthwise groove 4 together define a block-shaped intermediate land portions 7. The lateral circumferential grooves 3 and the lateral widthwise groove 5 together define a block-shaped lateral land portions 8. Here, the tread pattern is illustrated in the drawing by way of example, and the present disclosure may be applicable to a rib-based pattern and a block-based pattern, or any other arbitrary patterns. The intermediate widthwise groove 4 and the lateral widthwise groove 5 may be inclined with respect to the tire width direction, and may have a non-constant width. The lateral widthwise groove 5 does not need to be communicating with the tread surface end TE.

Figure 1B:
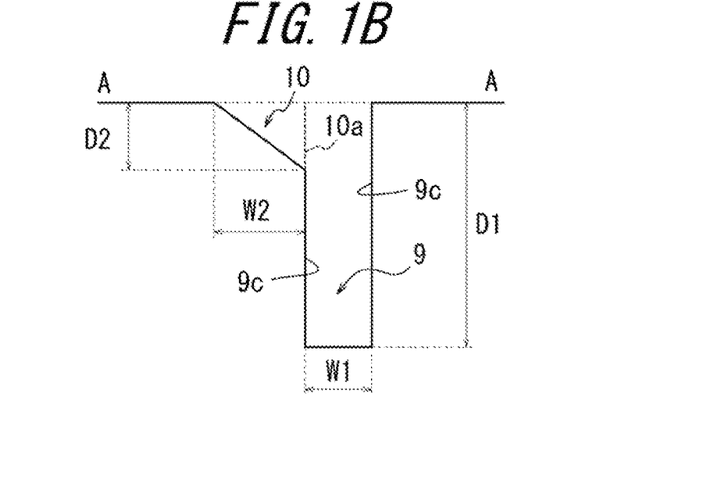
FIG. 1(b) is a sectional view taken along the line A-A of FIG. 1(a)

In the central land portion 6, narrow grooves 9 are formed extending in a direction inclined with respect to the tire circumferential direction. The narrow grooves 9 each open at both ends 9a, 9b to each one of the pair of central circumferential grooves 2 formed across the tire equatorial plane CL (in other words, the narrow grooves 9 each open to the outside of the land portion). As illustrated in FIG. 1(*b*), the narrow grooves 9 each have a groove width W1 that is smaller (narrower) than a groove depth D1 in the A-A section. In the illustrated example, the groove width W1 is in the tire circumferential direction. Further, the narrow grooves 9 each have an air inflow part 10 opening to the tread surface 1, the air inflow part 10 being formed on one of groove walls 9c facing each other in the tire circumferential direction. The narrow grooves 9 each have a maximum depth D1 and the air inflow part 11 has a maximum depth D2, where the D1 and the D2 satisfy the following condition: 5<D1/D2≤15.

It should be noted that the arrangement of the narrow grooves 9 is illustrated in the drawing by way of example, and for example, the narrow grooves 9 may be inclined at an arbitrary angle θ (0<θ≤90°) relative to the tire circumferential direction, and the plurality of tire grooves 9 may not be formed as being parallel to one another. Further, in the illustrated example, the narrow grooves 9 each open, at both ends 9a, 9b thereof, to each one of the pair of the central circumferential grooves 2, but the present disclosure is not limited thereto. The narrow grooves may be formed in, for example, the block-shaped intermediate land portions 7, so as to open at both ends thereof, to the central circumferential groove 2 and the lateral circumferential groove 3, respectively. The narrow grooves may also be formed, for example, in the block-shaped lateral land portions 8, so as to open at both ends thereof, to the lateral circumferential grooves 3 and to the tread surface ends TE, respectively. Further, the narrow grooves may be formed in the block-shaped intermediate land portions 7 so as to open at both ends thereof to the central circumferential groove 2 and the lateral circumferential grooves 3, respectively. The narrow grooves 9 may be bent or curved along the way, instead of only extending linearly.

Further, the position and the shape of the air inflow part 10 are illustrated by way of example, and the disclosed air inflow part 10 may be disposed at an arbitrary position in an arbitrary shape relative to the groove wall 9c of the narrow groove 9 as long as being formed on at least one of the groove walls 9c facing each other in the tire circumferential direction. The air inflow part 10 may be formed in a parallelogram in plane shape in the developed view of the tread surface, with a pair of opposite sides being parallel to the groove wall 9c of the narrow groove 9 while the other pair of opposite sides being parallel to the tire circumferential direction. In addition thereto, the air inflow part 10 may also be formed in another parallelogram with a pair of opposite sides being parallel to the groove wall 9c of the narrow groove 9 while the other pair of opposite sides being inclined relative to the tire circumferential direction. The air inflow part 10 may be trapezoidal, semicircular, triangular, or the like in plane shape in the developed view of the tread surface.

An operation of the disclosed pneumatic tire is described in below.

When the tire rotates, wind (air) flows around the tire in a direction opposite to the rotation direction of the tire. The wind may be taken into the grooves formed on the tread surface 1, to thereby dissipate heat from the tread portion, which lowers the temperature of the tread portion. When the grooves formed on the tread surface 1 are large in width, wind can be taken into the grooves but the land portion is reduced in rigidity, leading to deterioration of antiwear performance and steering stability. On the other hand, when the grooves formed on the tread surface 1 are small enough in width only not to affect rigidity of the land portion, the grooves cannot take wind thereinto. That is, most of the wind is not taken into the narrow groove 9, with only a part of the wind being taken into the narrow groove 9. However, even the wind that has been taken into the narrow groove 9 only passes through a shallow portion of the narrow groove 9 and is expelled from the narrow groove 9 without reaching the groove bottom of the narrow groove 9, which thus produces only a small effect of lowering the temperature of the tread portion.

In light thereof, the air inflow part 10 is formed on the windward-side groove wall 9c of the narrow groove 9, that is, the tire is mounted onto a vehicle for use such that the groove wall 9c formed with the air inflow part 10 is disposed on the windward side, to thereby take most of the wind into the narrow groove 9 and allow the wind thus taken to reach close to the groove bottom. Meanwhile, the wind that has been taken into the narrow groove 9 flows out from either one of the ends 9a and 9b on both ends of the narrow groove 9.

Further, as in the illustrated example, when an air inflow part is formed in the block-shaped central land portion 6 where the narrow grooves 9 each open at both ends 9a, 9b thereof to the central circumferential grooves 2, respectively, the rigidity of the land portion is likely to reduce. However, the disclosed air inflow part 10 is formed in such a manner that the maximum depth D1 of the narrow groove 9 and the maximum depth D2 of the air inflow part satisfy: 5<D1/D2≤15, to thereby properly ensure rigidity of the land portion. Further, as described above, wind generated by the rotation of the tire is taken into the narrow grooves 9 through the air inflow part 10, to thereby improve the heat dissipation effect in the tread portion. In particular, the disclosed pneumatic tire produces a prominent effect when applied to a large tire for use in trucks, buses, and construction vehicles, which are otherwise susceptible to the problem of heat generation in the tread portion along with the increase in size. Further, the disclosed pneumatic tire produces a further prominent effect when applied to a pneumatic tire for construction vehicles, because the tire is exposed on the vehicle side (opposite side to the contact surface that is in contact with the road surface) without being covered by the vehicle. It should be noted that when the aforementioned D1/D2 is less than 6, the volume of the land portion is excessively reduced, which leads to a fear that the land portion may have insufficient rigidity; while when the D1/D2 exceeds 15, the effect of taking into wind is reduced, which leads to a fear that the effect of dissipating heat becomes insufficient. Further, in terms of ensuring sufficient rigidity of the land portion and heat dissipation effect, it is more preferred that the D1 and the D2 satisfy the following relation: 5<D1/D2≤15.

The depth of the air inflow part 10 may preferably become maximum at the groove wall opening edge 10a that opens to the groove wall 9c of the narrow groove 9. This configuration makes the opening larger, allowing air to readily flow into the narrow groove 9. The air inflow part 10 may preferably have a sectional profile where the air inflow part 10 gradually increases in depth from one end of the narrow groove 9 farther from the groove wall opening edge 10a of the narrow groove 9 toward the groove wall opening edge 10a. This configuration can increase the wind inflow effect, and also suppress wasteful reduction of the volume of the land portion, which prevents reduction of rigidity in the land portion. Here, the bottom face of the air inflow part 10 may be planar or curved. The depth of the air inflow part 10 may increase stepwise toward the groove wall opening edge 10a, or the depth of the air inflow part 10 may be constant.

When the tire has a directional pattern in which the air inflow part 10 is formed in only one of the groove walls 9c of the narrow groove 9 and all the narrow grooves 9 have the air inflow parts 10 disposed on the groove wall 9c on the same direction side in the tire circumferential direction, the pneumatic tire may preferably be mounted onto a vehicle such that the air inflow part 10 is disposed on the windward side. However, in terms of convenience, the air inflow parts 10 may preferably be formed on both of the groove walls 9c facing each other of the narrow groove 9, that is, the groove walls 9c on both sides. Further, even in a case where the air inflow part 10 is only formed on either one, but not both, of the groove walls 9c, the narrow groove 9 having the air inflow part 10 formed on the leeward-side groove wall 9c and the narrow groove 9 having the air inflow part 10 formed on the windward-side groove wall 9c may respectively be formed so as to have a non-directional pattern. When the air inflow parts 10 are formed on the groove walls 9c on both sides of the narrow groove 9, a wind flow is formed, for example, such that air flows into the narrow groove 9 from the air inflow part 10 formed on the windward-side groove wall 9c and passes through within the narrow groove 9, so as to flow out from the narrow groove end 9a or 9b on the leeward side, which improves the heat dissipation effect.

In the case where the air inflow parts 10 are respectively formed on the groove walls 9c on both sides of the narrow groove 9, a center of one of the air inflow parts 10 along the longitudinal direction of the narrow groove 9 at the groove wall opening edge 10a opening to the groove wall 9c, the air inflow part 10 being formed on one of the groove walls 9c of the narrow groove 9, may preferably be spaced apart in the longitudinal direction of the narrow groove 9 from a center of the other one of the air inflow parts 10 along the longitudinal direction of the narrow groove 9 at the groove wall opening edge 10a, the air inflow part 10 being formed on the other one of the groove walls 9c of the narrow groove 9, so that the inflow parts 10 do not coincide with one another in position in the longitudinal direction of the narrow grooves. With this configuration, for example, air that has flowed in from the air inflow part 10 on the windward side collides with the groove wall 9c on the leeward side and is dispersed, which allows air to more reliably flow into the narrow groove 9, to thereby further ensure improvement in heat dissipation effect.

Further, in terms of improving the heat dissipation effect by means of the air inflow part 10, it is preferred that the narrow groove 9 should desirably be inclined at an angle of 45° or more and 90° or less in the tire circumferential direction. This configuration makes it hard to allow wind to flow into the narrow groove 9 from the central circumferential groove 2, to thereby improve the heat dissipation effect to be provided by the air inflow part.

In the narrow groove 10 to be provided with the air inflow part 10, the groove width W1 is set to be smaller than the groove depth D1 for the following reason: that is, the narrow groove 9 having a larger depth and a smaller width can make it more easy to take air thereinto, which makes the disclosed effect more prominent. Wind may be taken into the groove with more ease along with an increase of the groove width W1, which however makes it difficult to ensure rigidity of the land portion.

The air inflow part 10, even if being satisfactorily small in size relative to the size of the land portion, can still increase greatly the amount of air entering the narrow groove 9. Thus, the air inflow part 10 may be formed in a size enough to serve the purpose, without significantly reducing the volume of the land portion. Therefore, the air inflow part 10 may be formed with negligibly small impact on the antiwear performance and steering stability.

Meanwhile, if the air inflow part 10 is formed having a length extending throughout the longitudinal direction of the narrow groove 9, there is a fear that the rigidity of the land portion is wastefully reduced, leading to an excessive decrease of the rigidity of the land portion. In addition, a uniform amount of air is inadvertently taken into the entire narrow groove 9 across the longitudinal direction thereof, and the air thus taken into the narrow groove 9 is less likely to flow therewithin and may possibly be hindered from flowing out from the narrow groove 9. Therefore, the air inflow part 10 may preferably formed in a portion of the narrow groove 9 in the longitudinal direction. Specifically, the air inflow part 10 may preferably have a length L2 (length along the longitudinal direction of the narrow groove 9) of 5 mm or more and ½ or less of a length L1 of the narrow groove 9 along the longitudinal direction.

Further, the air inflow part 10 becomes smaller along with the wear of the tread portion, with the result that the effect of taking wind thereinto or the heat dissipation performance is reduced. However, the amount of heat to be generated in the tread portion also reduces along the wear of the tread portion, and thus, there is little need to design the air inflow part 10 of a brand new tire to be particularly large enough to withstand the wear.

Meanwhile, the land portion generally generates more heat in the tire widthwise center or in the vicinity of the tire equatorial plane CL, and thus, the air inflow part 10 may preferably be formed in a tire widthwise position of a portion where more heat is to be generated. Further, in the case where the narrow groove is inclined with respect to the tire width direction, wind having flowed into the narrow groove tends to flow toward the leeward side, and thus, the air inflow part 10 may preferably be formed on the windward-side groove wall 9c in the tire widthwise position on the windward side relative to a portion to be cooled (portion where more heat is to be generated). Further, as in the aforementioned embodiment, when the narrow groove 9 opens to the circumferential groove (central circumferential groove 2 in the example of FIG. 1), wind flowing within the circumferential groove tends to flow into the narrow groove 9 from the opening edge on the windward side, and the air thus having flowed into the narrow groove 9 collides with the air having flowed into the narrow groove 9 from the air inflow part 10. The point of collision of these two different flows of air sees reduction in heat dissipation effect. Therefore, the air inflow part 10 may preferably be formed on the windward side in the width position relative to a portion to be cooled, so that the point of collision of the air having flowed into the narrow groove 9 and the air having flowed into the narrow groove 9 from the air inflow part 10 should not be formed on a portion to be cooled. Further, when forming the air inflow part 10, it may be preferred to suppress airflow from the circumferential groove; specifically, for example, it may be desirable to take the following measures such as: to form the narrow groove 9 parallel to the tire width direction; to reduce the width of the groove itself extending in the tire circumferential direction; to form the narrow groove 9 such that the opening is positioned on the leeward side; or to prevent the narrow groove from communicating with the tread surface end TE.

Figure 2:
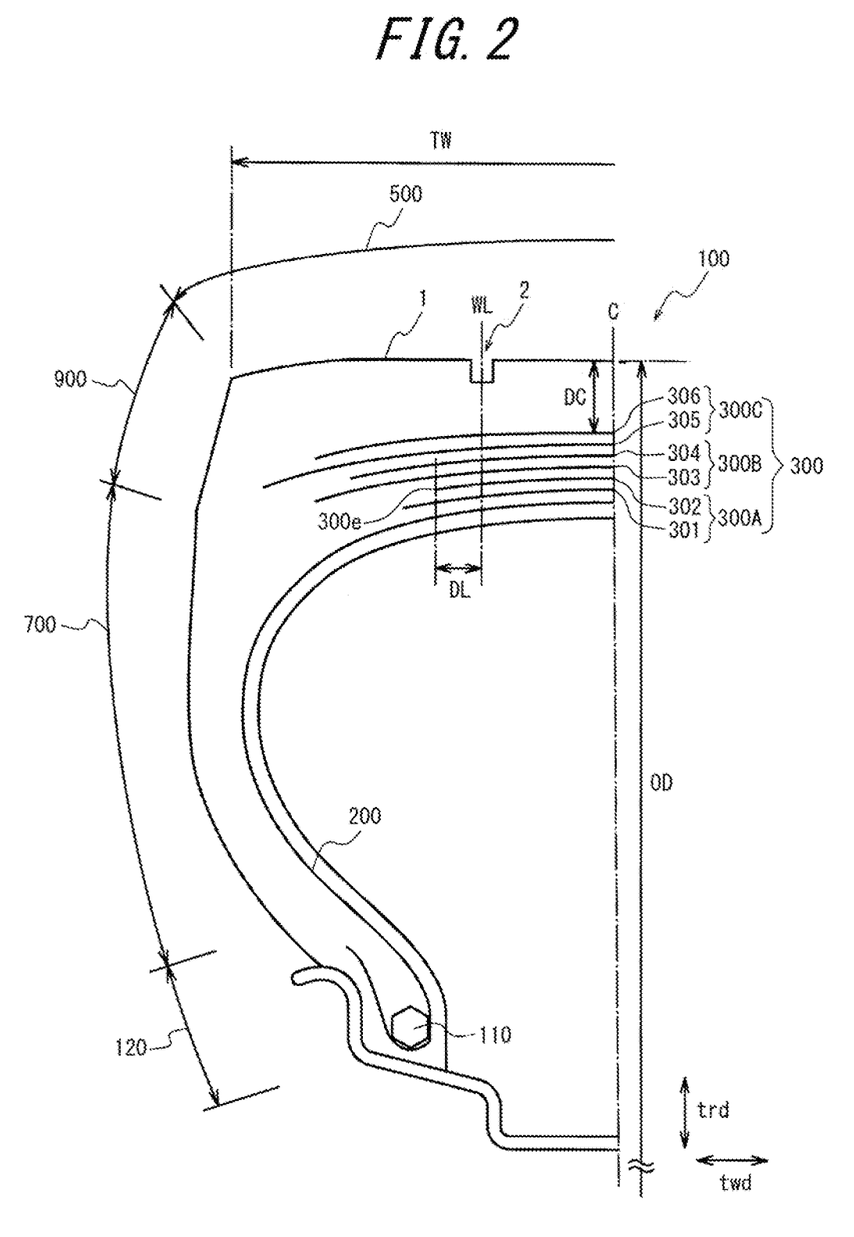
FIG. 2 is a sectional view in the tire width direction, illustrating an internal structure of the disclosed pneumatic tire according to an embodiment thereof.

FIG. 2 is a sectional view in the tire width direction, illustrating an internal structure of the disclosed pneumatic tire according to an embodiment thereof, in particular, a heavy load tire for a construction vehicle or the like. As illustrated in FIG. 2, the tire 100 is larger in rubber gauge (rubber thickness) of a tread portion 500, as compared with a pneumatic tire to be mounted onto a passenger car or the like. Note that the tire internal structure to be described in below is applicable to the respective tires each having the tread pattern illustrated with reference to FIG. 1.

Specifically, the tire 100 satisfies the relation of DC/OD≥0.015, where the OD represents the tire outer diameter and the DC represents the rubber gauge of the tread portion 500 at a position of the tire equatorial plane C.

The tire outer diameter OD (in the unit of mm) refers to the diameter of the tire 100 at a portion where the outer diameter of the tire 100 becomes maximum (such portion generally corresponds to the tread portion 500 near the tire equatorial plane C). The rubber gauge DC (in the unit of mm) refers to the thickness of the tread portion 500 at the position of the tire equatorial plane C. The rubber gauge DC is exclusive of the thickness of a belt 300. When the circumferential groove is formed at a position including the tire equatorial plane C, the rubber gauge DC refers to the rubber thickness of the tread portion 500 at a position adjacent to the circumferential groove.

As illustrated in FIG. 2, the tire 100 includes a pair of bead cores 110, a carcass 200, and the belt 300 including a plurality of belt layers. Note that FIG. 2 illustrates the tire 100 only in half width, whereas the other half width of the tire 100 not shown is similarly structured.

The bead core 110 is disposed in a bead portion 120. The bead core 110 is constituted of a bead wire (not shown).

The carcass 200 constitutes the skeleton of the tire 100. The carcass 200 is positioned from the tread portion 500 to come across a buttress portion 900 and a sidewall portion 700 to the bead portion 120.

The carcass 200 is disposed between the pair of bead cores 110 and has a toroidal shape. The carcass 200 in this embodiment is disposed around the bead core 110. The carcass 200 is in contact with the bead core 110. The carcass 200 is supported at both ends in the tire width direction twd by a pair of bead portions 120.

The carcass 200 has a carcass cord that extends in a predetermined direction when viewed in plan from the tread surface 1 side. In this embodiment, the carcass cord extends along the tire width direction twd. Steel wire may, for example, be used as the carcass cord.

The belt 300 is disposed in the tread portion 500. The belt 300 is positioned on the outside of the carcass 200 in the tire radial direction trd. The belt 300 extends in the tire circumferential direction. The belt 300 has a belt cord that extends as being inclined with respect to a predetermined direction as a direction in which the carcass cord extends. A steel cord, for example, may be used as the belt cord.

The belt 300 including the plurality of belt layers includes: a first belt layer 301; a second belt layer 302; a third belt layer 303; a fourth belt layer 304; a fifth belt layer 305; and a sixth belt layer 306.

The first belt layer 301 is positioned on the outside of the carcass 200 in the tire radial direction trd. The first belt layer 301 is positioned on the innermost side in the tire radial direction trd, among the plurality of belt layers forming the belt 300. The second belt layer 302 is positioned on the outside of the first belt layer 301 in the tire radial direction trd. The third belt layer 303 is positioned on the outside of the second belt layer 302 in the tire radial direction trd. The fourth belt layer 304 is positioned on the outside of the third belt layer 303 in the tire radial direction trd. The fifth belt layer 305 is positioned on the outside of the fourth belt layer 304 in the tire radial direction trd. The sixth belt layer 306 is positioned on the outside of the fifth belt layer 305 in the tire radial direction trd. The sixth belt layer 306 is positioned on the outermost side in the tire radial direction trd, among the plurality of belt layers forming the belt 300. In the tire radial direction trd, the first belt layer 301, the second belt layer 302, the third belt layer 303, the fourth belt layer 304, the fifth belt layer 305, and the sixth belt layer 306 are arranged in the stated order from the inside to the outside.

According to this embodiment, in the tire width direction twd, the first belt layer 301 and the second belt layer 302 each have a width (the width being measured along the tire width direction twd; hereinafter the same) defined to be 25% or more and 70% or less of the tread width TW. In the tire width direction twd, the third belt layer 303 and the fourth belt layer 304 each have a width defined to be 55% or more and 90% or less of the tread width TW. In the tire width direction twd, the fifth belt layer 305 and the sixth belt layer 306 each have a width defined to be 60% or more and 110% or less of the tread width TW.

According to this embodiment, in the tire width direction twd, the width of the fifth belt layer 305 is larger than the width of the third belt layer 303, the width of the third belt layer 303 is equal to or larger than the width of the sixth belt layer 306, the width of the sixth belt layer 306 is larger than the width of the fourth belt layer 304, the width of the fourth belt layer 304 is larger than the width of the first belt layer 301, and the width of the first belt layer 301 is larger than the width of the second belt layer 302. In the tire width direction twd, among the plurality of belt layers forming the belt 300, the fifth belt layer 305 is largest in width and the second belt layer 302 is smallest in width. Accordingly, the belt 300 including the plurality of belt layers includes a shortest belt layer (i.e., the second belt layer 302) that is shortest in length in the tire width direction twd.

The second belt layer 302, which is the shortest belt layer, has a belt end 300e serving as an end in the tire width direction twd.

In this embodiment, when viewed in plan from the tread surface 1 side, the belt cords of the first belt layer 301 and the second belt layer 302 are inclined at an angle of 70° or more and 85° or less with respect to the carcass cord. The belt cords of the third belt layer 303 and the fourth belt layer 304 are inclined at an angle of 50° or more and 75° or less with respect to the carcass cord. The belt cords of the fifth belt layer 305 and the sixth belt layer 306 are inclined at an angle of 50° or more and 70° or less.

The belt 300 including the plurality of belt layers includes: an inner crossing belt group 300A; an intermediate crossing belt group 300B; and an outer crossing belt group 300C. The crossing belt groups 300A to 300C each refer to a group of a plurality of belt layers in which belt cords constituting the respective belt layers in each group cross one another between the belt layers adjacent to each other within the group (preferably across the tire equatorial plane), in plan view from the tread surface 1 side.

The inner crossing belt group 300A includes a set of belt layers, and positioned on the outside of the carcass 200 in the tire radial direction trd. The inner crossing belt group 300A is constituted of the first belt layer 301 and the second belt layer 302. The intermediate crossing belt group 300B includes a set of belt layers, and positioned on the outside of the inner crossing belt group 300A in the tire radial direction trd. The intermediate crossing belt group 300B is constituted of the third belt layer 303 and the fourth belt layer 304. The outer crossing belt group 300C includes a set of belt layers, and positioned on the outside of the intermediate crossing belt group 300B in the tire radial direction trd. The outer crossing belt group 300C is constituted of the fifth belt layer 305 and the sixth belt layer 306.

In the tire width direction twd, the inner crossing belt group 300A has a width defined to be 25% or more and 80% or less of the tread width TW. In the tire width direction twd, the intermediate crossing belt group 300B has a width defined to be 55% or more and 90% or less of the tread width TW. In the tire width direction twd, the outer crossing belt group 300C has a width defined to be 60% or more and 110% or less of the tread width.

When viewed in plan from the tread surface 1 side, the belt cord of the inner crossing belt group 300A is inclined at an angle of 70° or more and 85° or less with respect to the carcass cord. When viewed in plan from the tread surface 1 side, the belt cord of the intermediate crossing belt group 300B is inclined at an angle of 50° or more and 75° or less with respect to the carcass cord. When viewed in plan from the tread surface 1 side, the belt cord of the outer crossing belt group 300C is inclined at an angle of 50° or more and 70° or less with respect to the carcass cord.

When viewed in plan from the tread surface 1 side, the belt cord of the inner crossing belt group 300A is inclined with respect to the carcass cord at an angle larger than those of the rest of the belt cords. The belt cord of the intermediate crossing belt group 300B is inclined with respect to the carcass cord at an angle equal to or larger than that of the belt cord of the outer crossing belt group 300C.

The circumferential groove (intermediate circumferential groove) 2 is formed to have a length DL of 200 mm or less which is measured along the tire width direction twd from the belt end 300e to the tire width direction innermost position (i.e., bent part to the inside in the tire width direction) of a groove width center line WL passing through the widthwise center of the circumferential groove 2 when viewed in plan from the tread surface 1 side of the tire 100.

An operation of the air inflow part 10 is described in detail below, with reference to the drawings.

Figure 3A:
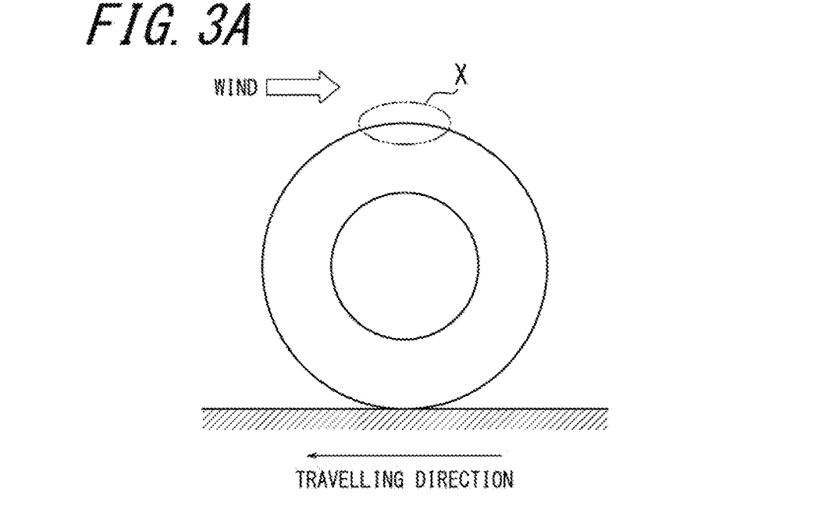
FIGS. 3(a) to 3(c) are a view for illustrating an operation of the disclosed pneumatic tire.
Figure 3B:
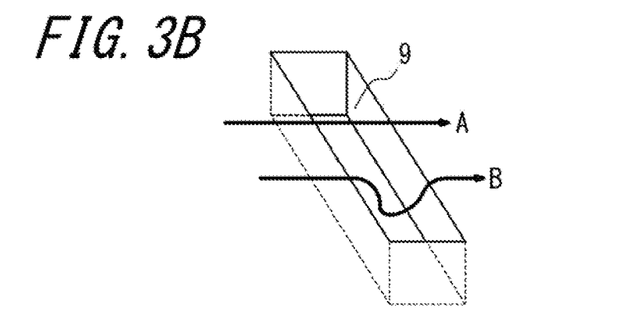

As illustrated in FIG. 3(*a*), when the tire rotates, wind flows around the tire in a direction opposite to the traveling direction of the tire. The wind may be taken into the grooves formed on the tread surface 1, to thereby dissipate heat from the tread portion, which lowers the temperature of the tread portion. When the grooves formed on the tread surface 1 are large in width, wind can be taken into the grooves but the land portion is reduced in rigidity, leading to deterioration of antiwear performance and steering stability. On the other hand, when the grooves formed on the tread surface 1 are small enough in width only not to affect rigidity of the land portion, the grooves cannot take wind thereinto. Specifically, referring to FIG. 3(*b*) which illustrates a portion denoted by X of FIG. 3(*a*), most of the wind is not taken into the narrow groove 9 formed on the tread surface 1 as indicated by the arrow A, and only a part of the wind is taken into the narrow groove 9 as indicated by the arrow B. However, even the wind indicated by the arrow B only passes through a shallow portion of the narrow groove 9 and is expelled from the narrow groove 9 without reaching the groove bottom of the narrow groove 10, which thus produces only a small effect of lowering the temperature of the tread portion.

Figure 3C:
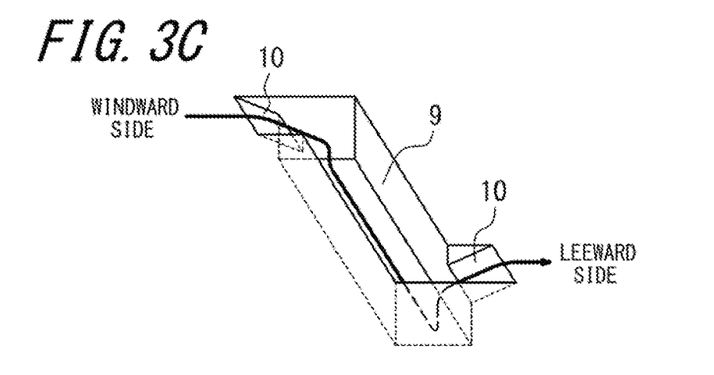

In light thereof, the air inflow part 10 is formed on the windward-side groove wall of the narrow groove 9 as illustrated in FIG. 3(*c*), to thereby take most of the wind into the narrow groove 9 and allow the wind thus taken into the narrow groove 9 to reach the groove bottom. Further, when the air inflow part 10 is also formed on the leeward-side groove wall, the wind is allowed to flow out from the air inflow part 10 thus formed. Note that even if the air inflow part 10 is not formed on the leeward-side groove wall, the wind having nowhere to go at the end of the narrow groove 9 can still flow out from the edge of the leeward-side groove wall. This configuration is capable of increasing the effect of lowering the temperature of the tread portion.

In particular, the disclosed effect becomes prominent when applied to a pneumatic tire for a construction vehicle because the tire has a portion on the vehicle side (opposite side to the tread surface side) denoted by X in the drawing which is exposed without being covered by the vehicle.

Referring to FIG. 4, description is given of numerical analysis on the wind speed vector within the narrow groove 9.

Figure 4A:
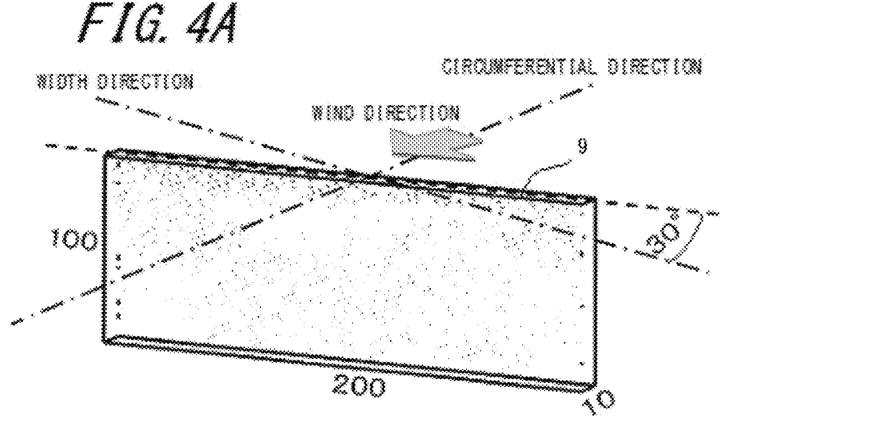
FIGS. 4(a) to 4(c) are an illustration of a wind speed vector within the narrow groove.
Figure 4B:
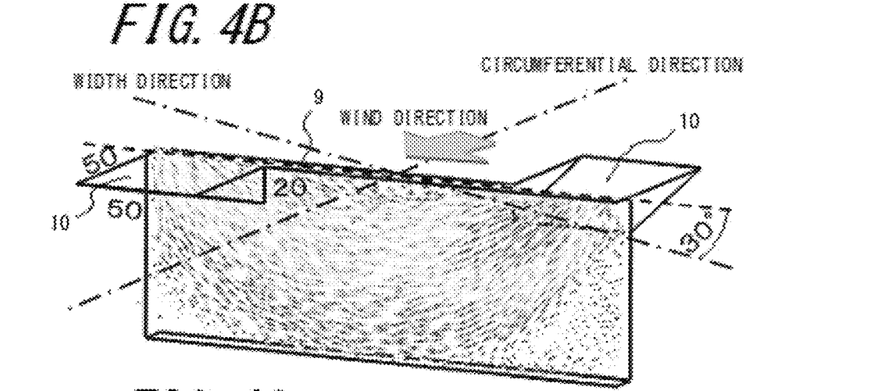
Figure 4C:
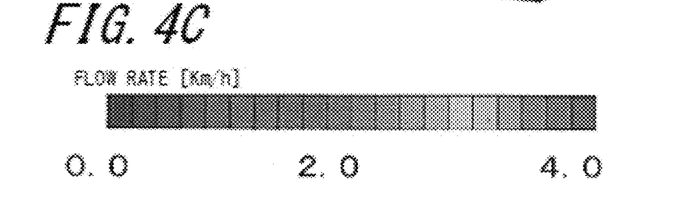

FIG. 4(*a*) illustrates the narrow groove 9 inclined at an angle of 30° with respect to the tire width direction, which is not provided with the air inflow part 10. FIG. 4(*b*) illustrates the narrow groove 9 provided with the air inflow parts 10 on the windward side and the leeward side. FIG. 4(*c*) shows the flow rate. The narrow groove 9 is in a size of 200 mm in length in the longitudinal direction, 10 mm in width, and 100 mm in depth, and inclined with respect to the tire width direction at an angle of 30°. The air inflow part 10 is in a size of 50 mm in length (length along the longitudinal direction of the narrow groove 9), 50 mm in width, and 20 mm in depth at the deepest part.

It can be appreciated from FIG. 4(*a*) that hardly any wind is taken into the narrow groove 9 when the air inflow part 10 is not provided.

On the other hand, it can also be appreciated from FIG. 4(*b*) that when the air inflow part 10 is provided, the wind speed vector becomes maximum in the vicinity of the air inflow part 10 on the windward-side groove wall and wind is taken into the narrow groove 9, and the wind speed vector again increases in the vicinity of the air inflow part 10 on the leeward-side groove wall.

The narrow groove 9 may preferably close during ground contact. Specifically, the narrow groove 9 may preferably have a width of about 10 mm to 20 mm. When the narrow groove 9 closes upon ground contact, the rib-shaped central land portion 6 becomes continuous. This enhances rigidity of the land portion to thereby improve antiwear performance.

Various modified examples of the air inflow part 10 are described in below, referring to FIGS. 5 to 8. In the drawings, the wind directions are indicated by the arrows.

Figure 5A:
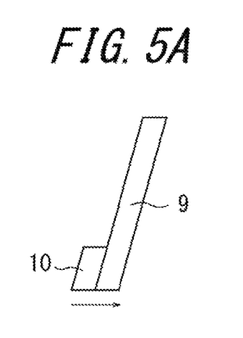
FIGS. 5(a) to 5(c) are an illustration of a modified example of the inflow part.
Figure 5B:
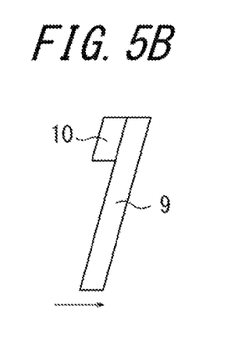
Figure 5C:
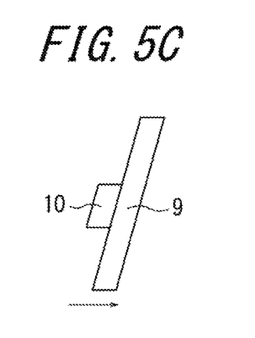

When the narrow groove 9 is formed extending in a direction inclined with respect to the tire width direction, the air inflow part 10 may be formed, as illustrated in FIG. 5(*a*), on the groove wall at one end which receives wind first, of both ends of the narrow groove 9, or may be formed, as illustrated in FIG. 5(*b*), on the groove wall at the other end which receives wind last. Otherwise, as illustrated in FIG. 5(*c*), the air inflow part 10 may be formed in the central region of the narrow groove 9.

In the case where the air inflow parts 10 are respectively formed on the groove walls on both of the windward and leeward sides of the narrow groove 9, a center point A of one of the air inflow parts 10 along the longitudinal direction of the narrow groove 9, the air inflow part 10 being formed on one of the groove walls of the narrow groove 9, may preferably be spaced apart in the longitudinal direction of the narrow groove 9 from a center point B of the other one of the air inflow parts 10 along the longitudinal direction of the narrow groove 9, the air inflow part 10 being formed on the other one of the groove walls of the narrow groove 9, so that the inflow parts do not overlap one another with respect to the tire circumferential direction (direction in which wind is coming from).

Figures 6A, 6B:
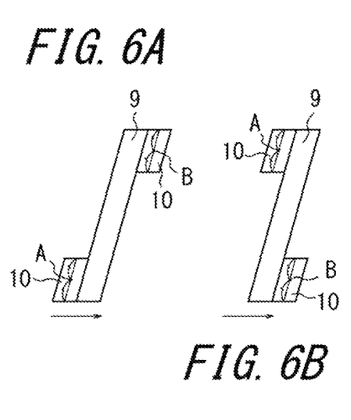
FIGS. 6(a) to 6(e) are an illustration of a modified example of the inflow part.
Figures 6C, 6D, 6E:
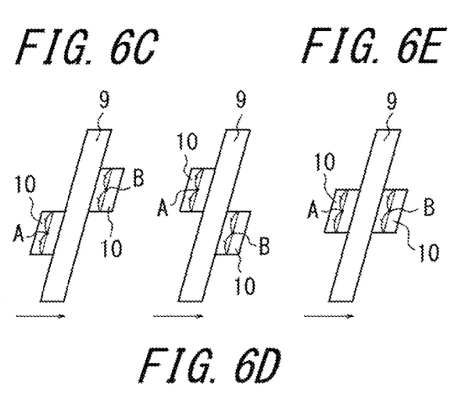

Specifically, the air inflow parts 10 may preferably be formed on both sides of the narrow groove 9 as illustrated in FIGS. 6(a) and 6(b), and may preferably be formed in the central region as being displaced from each other as illustrated in FIGS. 6(c) and 6(d). Otherwise, as illustrated in FIG. 6(e), the air inflow parts 10 may be also formed side by side in the central region of the narrow groove 9; that is, the point A and the point B may be arranged without being spaced apart from each other in the longitudinal direction of the narrow groove 9.

Figure 7A:
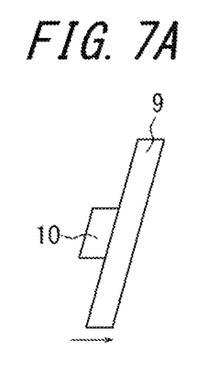
FIGS. 7(a) to 7(h) are an illustration of a modified example of the inflow part.
Figure 7B:
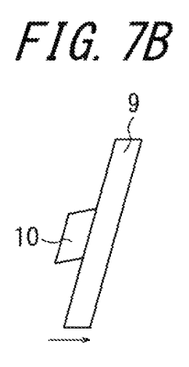
Figure 7C:
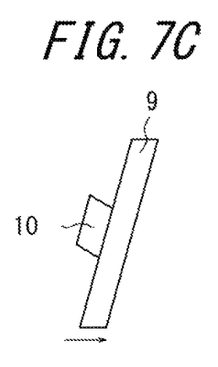
Figure 7D:
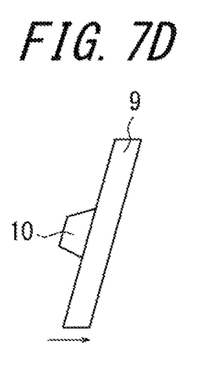
Figure 7E:
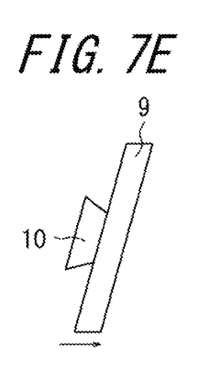
Figure 7F:
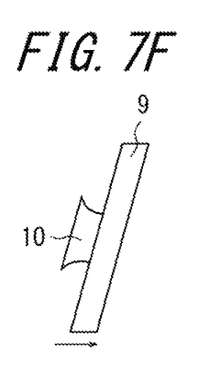
Figure 7G:
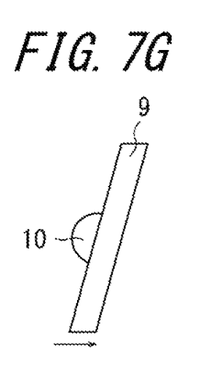
Figure 7H:
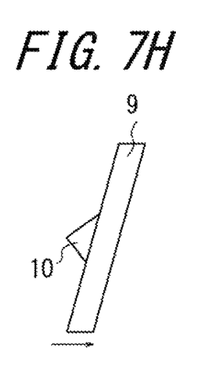

A planar shape of the air inflow part 10 viewed from the tread surface may be a parallelogram with a pair of opposite sides parallel to the wall of the narrow groove 9 and the other pair of opposite sides parallel to the tire circumferential direction as illustrated in FIG. 7(a), or may be parallelogram with a pair of opposite sides parallel to the wall of the narrow groove 9 and the other pair of opposite sides inclined with respect to the tire circumferential direction as illustrated in FIGS. 7(b) and 7(c). Further, as illustrated in FIG. 7(d), the planar shape of the air inflow part 10 may be a trapezoid with the lower base opening to the wall of the narrow groove 9 and the upper base being positioned on the farther side from the wall of the narrow groove 9; that is, the trapezoid gradually reduces in length in the tire width direction from the wall side of the narrow groove 9. Alternatively, as illustrated in FIG. 7(e), the planar shape of the air inflow part 9 may be a trapezoid with the upper base opening to the wall of the narrow groove 9 and the lower base positioned on the farther side from the wall of the narrow groove 9; that is, the trapezoid gradually increases in length in the tire width direction from the wall of the narrow groove 9. Still alternatively, as illustrated in FIG. 7(f), the planar shape of the air inflow part 10 may be a trapezoid shown in FIG. 7(e), with two sides other than the upper base and the lower base being curved. Otherwise, the planar shape of the air inflow part 10 may be semicircular as illustrated in FIG. 7(g), or may be triangular as illustrated in FIG. 7(h).

Figure 8A:
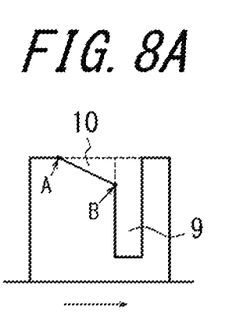
FIGS. 8(a) to 8(i) are an illustration of a modified example of the inflow part.
Figure 8B:
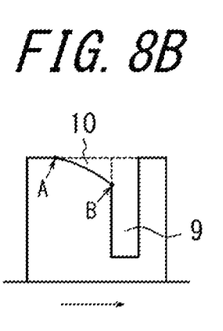
Figure 8C:
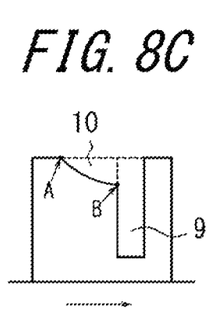
Figure 8D:
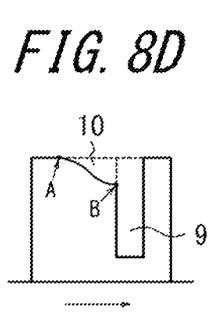
Figure 8E:
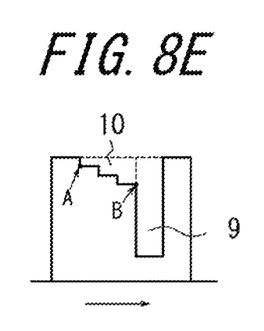
Figure 8F:
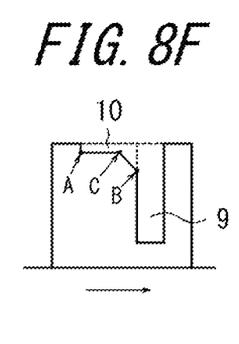
Figure 8G:
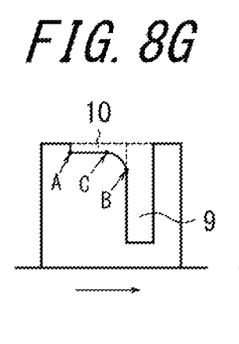
Figure 8H:
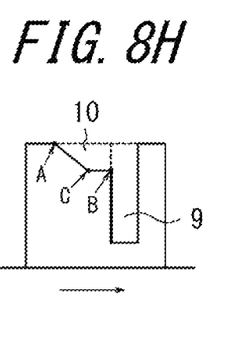
Figure 8I:
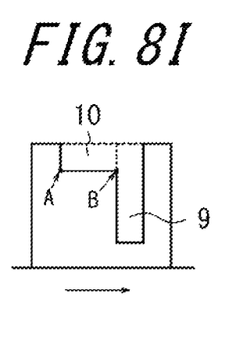

A side profile of the air inflow part 10 in section perpendicular to the longitudinal direction of the narrow groove may preferably be formed such that, as illustrated in FIGS. 8(a) to 8(d), the depth of the air inflow part 10 gradually increases from one side (point A in the drawing) farther from the wall of the narrow groove 9 to the other side (point B in the drawing) opening to the wall of the narrow groove 9, where the air inflow part 10 becomes deepest. However, the bottom plane of the air inflow part 10 may be flat as illustrated in FIG. 8(a), or may be curved as illustrated in FIGS. 8(b) to 8(d). Further, as illustrated in FIG. 8(e), the depth of the air inflow part 10 may increase stepwise from the point A to the point B. Alternatively, as illustrated in FIGS. 8(f) and 8(g), the air inflow part 10 may be have a depth that is constant between the point A and the point C and gradually increases from the point C to the point B, or as illustrated in FIG. 8(h), the air inflow part 10 may have a depth that gradually increases from the point A to the point C and is constant from the point C to the point B. Otherwise, as illustrated in FIG. 8(i), the air inflow part 10 may have a depth that is constant from the point A to the point B.

EXAMPLES

Examples of the disclosed pneumatic tire are described in below.

As illustrated in FIG. 1(a), in an ultra-large ORR (off-the-Road Radial) tire having the tread pattern of FIG. 1(a), the narrow grooves 9 and the air inflow parts 10 are formed in various depths, so as to investigate the difference in heat dissipation effect. Table 1 shows the maximum depth dimensions D1 and D2 of the narrow groove 9 and the air inflow part 10 of each of the tires. Here, the longitudinal direction of the narrow groove 9 is inclined at an angle of 90° with respect to the tire circumferential direction, the narrow groove 9 has a width W1 of 20 mm, and the bottom of the air inflow part 10 has a planar shape which gradually increases in depth toward the groove wall opening edge 10 from one side of the narrow groove 9 farther from the groove wall opening edge 10a, and forms an angle of 20° with the block surface. The air inflow part 10 has a width W2 of 50 mm.

The block-shaped land portion defined by the narrow grooves 9 adjacent to one another in the tire circumferential direction and the central circumferential groove 2 has a length of 250 mm in the tire circumferential direction, a length of 200 mm in the tire width direction, and a height of 100 mm. The air inflow parts 11 are disposed on two points per each narrow groove 9.

TABLE 1

|  | Comp. Ex. 1 | Comp. Ex. 2 | Ex. 1 | Ex. 2 | Ex. 3 | Ex. 4 | Ex. 5 | Comp. Ex. 3 |
| --- | --- | --- | --- | --- | --- | --- | --- | --- |
| Maximum Depth of Narrow Groove D1 [mm] | 100 | 100 | 100 | 100 | 100 | 100 | 1000 | — |
| Maximum Depth of Air Inflow Part D2 [mm] | 100 | 20 | 16.7 | 12.5 | 10 | 8.4 | 6.7 | — |
| D1/D2 | 1 | 5 | 6 | 8 | 10 | 12 | 15 | — |
| Cooling Effect | 390 | 410 | 390 | 340 | 300 | 260 | 200 | 90 |
| Reduction of Land Portion Volume | 27.47% | 1.10% | 0.77% | 0.43% | 0.27% | 0.19% | 0.12% |  |

To measure the cooling effect, fluid numerical analysis (computational fluid dynamics (CFD)) is used to provide a uniform thermal flux distribution on the groove bottom of the narrow groove 9, so as to obtain a temperature distribution on the groove bottom in a state where wind was caused to uniformly blow at speeds of 20 km/h in the tire circumferential direction, and the temperature distribution is converted into a heat transfer coefficient distribution and evaluated.

Further, evaluated as an index of antiwear performance is the volume reduction ratio of the block-shaped land portion due to the formation of the air inflow part 10 therein, the block-shaped land portion being defined by the narrow grooves 9 adjacent to each other in the tire circumferential direction and the central circumferential groove 2.

Results of the measurement are shown in Table 1.

It can be appreciated from Table 1 that when the maximum depth D1 of the narrow groove 9 and the maximum depth D2 of the air inflow part 10 satisfies: 5<D1/D2≤15, the heat dissipation effect is significantly improved while ensuring rigidity of the land portion.

INDUSTRIAL APPLICABILITY

As described above, it becomes possible to provide a pneumatic tire improved in heat dissipation effect while ensuring the rigidity of the land portion.

REFERENCE SIGNS LIST 1 tread surface
2 central circumferential groove
3 lateral circumferential groove
4 intermediate widthwise groove
5 lateral widthwise groove
6 central land portion
7 block-shaped intermediate land portion
8 block-shaped lateral land portion
9 narrow groove
9c groove wall of the narrow groove
10 air inflow part
10a groove wall opening edge of the air inflow part

The invention claimed is:

1. A pneumatic tire comprising
a carcass, a belt and a narrow groove formed on a tread surface, the narrow groove extending in a direction inclined with respect to the tire circumferential direction and having a groove width smaller than a groove depth,
the narrow groove opening at both ends thereof to the outside of a land portion,
the narrow groove having an air inflow part formed on at least one of the groove walls facing each other in the tire circumferential direction, the air inflow part opening only to the tread and the narrow groove,
wherein the belt includes first, second, third, fourth, fifth and sixth belt layers arranged in the stated order from an inside to outside in a tire radial direction,
wherein in a tire width direction, each of the first and second belt layers has a width measured along the tire width direction defined to be 25% or more and 70% or less of a tread width, each of the third and fourth belt layers has a width defined to be 55% or more and 90% or less of the tread width, and each of the fifth and sixth belt layers has a width defined to be 60% or more and 110% or less of the tread width,
wherein belt cords of the first and second belt layer are inclined at an angle of 70° or more and 85° or less with respect to a carcass cord, belt cords of the third and fourth belt layers are inclined at an angle of 50° or more and 75° or less with respect to the carcass cord, and belt cords of the fifth and sixth belt layers are inclined at an angle of 50° or more and 70° or less with respect to the carcass cord,
wherein the narrow groove has a maximum depth D1 and the air inflow part has a maximum depth D2, the D1 and the D2 satisfying:

5<D1/D2≤15, wherein the air inflow part has a length of 5 mm or more along the longitudinal direction of the narrow groove and ½ or less of a length of the narrow groove along the longitudinal direction, and
wherein the air inflow part has a side profile in section perpendicular to the longitudinal direction of the narrow groove in which the depth of the air inflow part continuously increases from a point located on the tread surface to a point located on the groove wall of the narrow groove.

2. The pneumatic tire according to claim 1, wherein the air inflow part has a width that reaches its maximum at the groove wall opening edge opening to the groove wall of the narrow groove.

3. The pneumatic tire according to claim 1, wherein the air inflow part is formed on a part of the narrow groove along the longitudinal direction thereof.

4. The pneumatic tire according to claim 1, wherein the air inflow part is formed on both groove walls of the narrow groove, the groove walls facing each other in the tire circumferential direction.

5. The pneumatic tire according to claim 4, wherein a center of one of the air inflow parts along the longitudinal direction of the narrow grove at the groove wall opening edge opening to the groove wall, the air inflow part being formed on one of the groove walls of the narrow groove, is spaced apart in the longitudinal direction of the narrow groove from a center of the other one of the air inflow parts along the longitudinal direction of the narrow groove at the groove wall opening edge, the air inflow part being formed on the other one of the groove walls of the narrow groove.

6. The pneumatic tire according to claim 4, wherein each of the groove walls, facing each other in the tire circumferential direction, includes a single air inflow part.

7. The pneumatic tire according to claim 1, further comprising a pair of circumferential grooves formed on the tread surface and extending along the tire circumferential direction across a tire equatorial plane from each other, wherein a distance from a belt end of the belt layer having a shortest width to a groove width center line passing through a widthwise center one of the circumferential grooves along the tire width direction is 200 mm or less.

8. The pneumatic tire according to claim 1, wherein the tire satisfies a relation of DC/OD≥0.015, where OD is a tire outer diameter and DC is a rubber gauge of the tread at a position of a tire equatorial plane.

9. The pneumatic tire according to claim 1, wherein the narrow groove has a width of about 10 mm to 20 mm and closes during ground contact.

* * * * *